United States Patent

[11] 3,630,481

| [72] | Inventor | John B. McGay<br>1551 South Yorktown Place, Tulsa, Okla. 74104 |
|---|---|---|
| [21] | Appl. No. | 56,907 |
| [22] | Filed | July 21, 1970 |
| [45] | Patented | Dec. 28, 1971<br>Continuation-in-part of application Ser. No. 852,243, Aug. 21, 1969, now Patent No. 3,570,531, and a continuation-in-part of 48,040, June 22, 1970. This application July 21, 1970, Ser. No. 56,907 |

[54] DRIP-RATE CONTROL APPARATUS FOR INTRAVENOUS ADMINISTRATION
3 Claims, 3 Drawing Figs.

| [52] | U.S. Cl. | 251/6 |
|---|---|---|
| [51] | Int. Cl. | F16k 7/06 |
| [50] | Field of Search | 128/214; 251/4–10 |

[56] References Cited
UNITED STATES PATENTS

| 1,411,731 | 4/1922 | Kemper et al. | 251/6 X |
|---|---|---|---|
| 3,099,429 | 7/1963 | Broman | 251/6 |
| 3,102,710 | 9/1963 | Dresden | 251/9 |
| 3,189,038 | 6/1965 | Von Pechmann | 251/6 X |
| 3,477,454 | 11/1969 | Fields | 251/4 X |

*Primary Examiner*—M. Cary Nelson
*Assistant Examiner*—Richard Gerard
*Attorney*—Head & Johnson

ABSTRACT: A wedge-type pinch roller is formed of a resilient material and includes a peripheral opening capable of controlling the flow of flexible tubing used in intravenous administration sets. Movement of the roller element, in one position, relative to the flexible tubing pinches the tubing to effectuate in the remaining portion an orifice of size as a function of desired drip-rate flow therethrough. Movement in another position either changes said drip rate or closes the peripheral opening because of the resilient nature of the pinch roller and hence shuts off flow in the tubing.

Patented Dec. 28, 1971

3,630,481

INVENTOR.
JOHN B. MCGAY

BY
Head & Johnson
ATTORNEYS

DRIP-RATE CONTROL APPARATUS FOR INTRAVENOUS ADMINISTRATION

RELATED APPLICATIONS

This application is a continuation-in-part of copending application entitled "Tube Pincher For Intravenous Administration Set" filed Aug. 21, 1969, Ser. No. 852,243, now U.S. Pat. No. 3,570,531, and application identified as "Tube Pincher Apparatus For Intravenous Administration" filed June 22, 1970, Ser. No. 48,040.

BACKGROUND OF THE INVENTION

This invention relates to intravenous feeding and more particularly to a means for adjustably controlling the drip rate of the intravenous liquid from between zero to any desired flow rate.

As stated in the aforesaid prior copending applications which are incorporated herein for a reference, intravenous administration sets usually comprise a unitarily sealed and sterile package comprising a drip chamber, a plastic delivery tube leading from the drip chamber to the patient and an adjustable clamp on the tube, the flow of which may be regulated at a desired rate by the attending physician or nurse. Heretofore this regulation of the drip rate has been accomplished by clamping the plastic tubing across its entire width.

It has been found that the plastic delivery tubing has memory characteristic in that after any clamping thereof the tubing tends to return slowly to its original configuration. This memory characteristic of the tube causes changes and shrinkage of the orifice during the first few minutes of intravenous feeding and thereafter requires further adjustments to be made to allow for these changes.

The aforesaid prior copending applications teach that if the plastic tubing, rather than being pinched directly across its entire width, is pinched on the side by having a pincher element transverse across one edge of the tube, a substantially circular orifice is formed which achieves a substantially stable flow rate from the beginning to the end of the intravenous feeding.

SUMMARY OF THE INVENTION

Broadly, this invention presents a pinching mechanism utilizing a common and standard heretofore known tubing receiver housing having an inclined surface relative to which, slidably and rotatably received therein, is a cylindrical pinching element or roller which is adapted to pinch the tubing on one or both edges or sides of the tubing. The cylindrical pinching roller is formed of a resilient material and includes at its central periphery a groove which, in one position of the roller relative to the housing, pinches at least one and preferably each side of the tubing allowing the tubing to form an orifice within the peripheral groove to a desired drip rate and to another position in which the resilient tubing and groove are collapsed to shut off flow through the tubing. As a result a controllable orifice is formed within the tubing in which the memory characteristics of the tubing do not substantially change and hence do not harmfully affect the intravenous feeding rate.

DETAILED DESCRIPTION OF THE DRAWINGS

DETAILED DESCRIPTION

Figure 1:
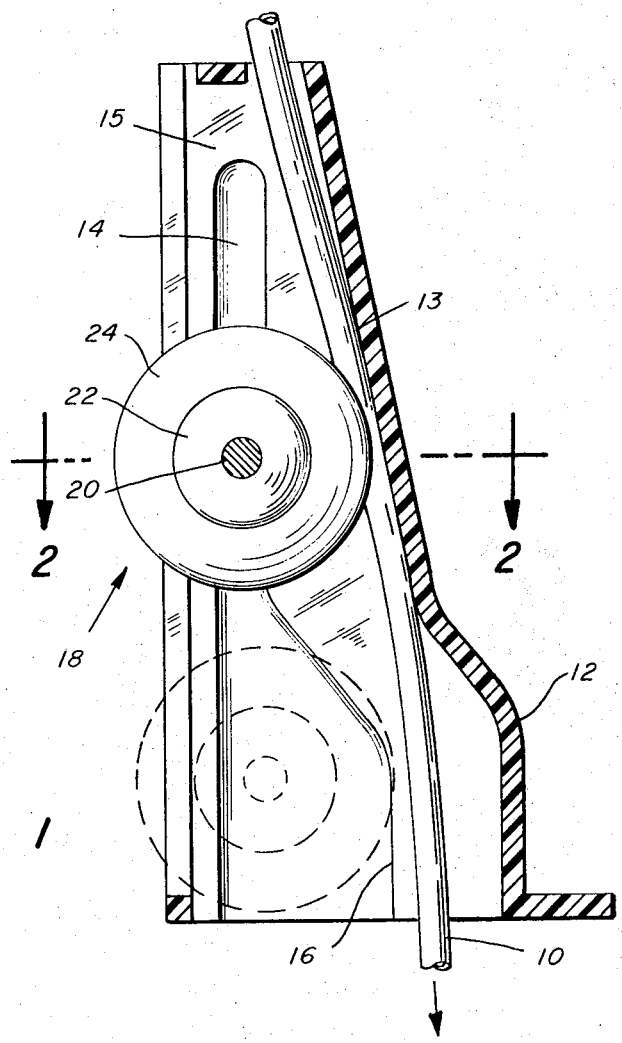
FIG. 1 is a sectional view of the pinching apparatus of this invention.
Figure 2:
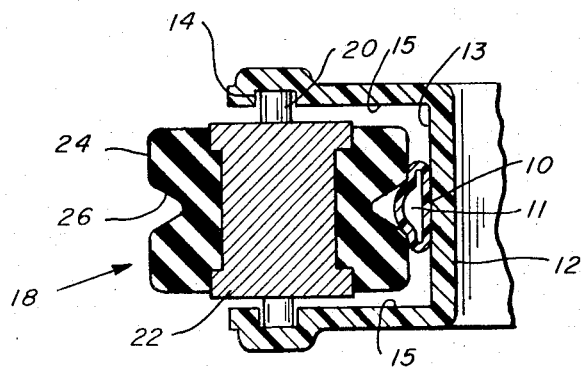
FIG. 2 is a sectional view taken along the line 2—2 of FIG. 1 and describes the operation of the pinching roller of this invention in one position.
Figure 3:
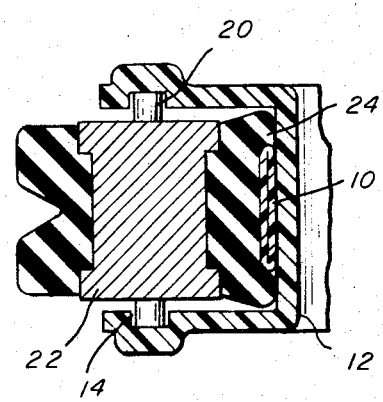
FIG. 3 is a sectional view similar to FIG. 2 depicting the pinching roller in this invention in another position shutting off all flow through the intravenous administration delivery tubing.

Turning now to FIG. 1 of the drawings, the drip-rate control apparatus of this invention is shown positioned upon a tubing of plastic delivery tubing 10. This tubing is connected to a typical drip chamber and supply container for the intravenous fluid not shown in this application reference being made to said copending applications. The plastic delivery tubing 10 is inserted through the housing 12 which housing incorporates an inclined surface 13. Each interior side 15 of the housing includes a groove 14 ordinarily positioned along a plane which is at an acute angle to the inclined surface 13. The groove terminates in an enlarged portion 16 at the lower end thereof. Pinch roller 18 is adapted to traverse relative to the inclined plane 13 within grooves 14 and 16. The roller incorporates for that purpose shaft 20 which extends thereinto and is retained by the housing from falling out thereof. In the preferred embodiment, the roller 18 further includes cylindrical portion 22 about which is supported a resilient rubber cylindrical portion 24. Portion 24 may be of resiliency equivalent to about 70 durometer. About the outer periphery of the resilient cylindrical portion 24 is a groove 26 which is adapted to be positioned relative to the intravenous administration tubing 10 as shown in FIGS. 2 and 3. In some instances the groove 26 may be positioned adjacent one edge of said tubing.

In the operation and usage of the apparatus of this invention it will be noted that while pinch roller 18 is within the enlarged groove area 16 the tubing 10 is freely opened and is usually capable of being inserted into the housing 12 as is shown in FIG. 1. Thereafter, to control the drip-rate flow through tubing 10, the pinch roller 18 is rolled upwardly relative to inclined surface 13. As such, the pinch roller, relative to the tubing 10, can assume a variety of drip-rate positions controlling the orifice 11 of tubing 10 substantially as shown in FIG. 2. Further upward movement of the pinch roller 18 relative to the inclined surface 13 changes that orifice until at a position substantially as shown in FIG. 3 wherein because of the relationship of the inclined plane and the resiliency of the roller portion 24 the peripheral groove 26 flattens closed, or substantially so, relative to the inclined surface 13 and hence closing tubing 10 from any further flow. The apparatus of this invention functions not only in the position shown but also if the flow is reversed in tubing 10.

Although the preferred embodiment of this invention has been explained in detail it is to be understood that the invention is not limited in its application to the details of construction and arrangement or parts or materials illustrated in accompanying drawings, since the invention is capable of other embodiments and of being practiced or carried out in various ways. Also, it is to be understood that the phraseology or terminology employed herein is for the purpose of description and not of limitation.

Although the theory of operation is not completely understood, it is believed that the achievement of a substantially average constant drip rate for the administration period appears to result from an interaction of the resilient rubber and the memory-flow characteristics of the plastic or vinyl plastic tubing.

What is claimed:

1. An apparatus to control the drip rate through intravenous administration tubing of the type having a housing through which said tubing is positioned, said housing including an inclined surface and a pinch roller adapted to move in a plane that would intersect said surface, the improvement in said roller comprising:

said roller composed of a resilient material and including a groove about its periphery such that when said roller is oriented opposite said surface with said tubing therebetween will, in one position, be such that the outer periphery of said roller adjacent said groove pinches at least a portion of one side of said tubing allowing the remainder of said tubing to enter said groove for control of said drip rate and in a second position, such that said groove is collapsed relative to said tubing to shut off flow through said tubing.

2. Apparatus of claim 1 the improvement comprising said roller outer periphery pinching said tubing on both sides of said groove in said one position.

3. Apparatus of claim 1 wherein said roller comprises a rigid cylindrical core about which said resilient material is attached.

* * * * *